United States Patent [19]

Hazenbroek et al.

[11] Patent Number: 5,147,240
[45] Date of Patent: Sep. 15, 1992

[54] THIGH JOINT SEPARATOR AND CARCASS HALVING APPARATUS

[76] Inventors: Jacobus E. Hazenbroek; Bastiaan Verrijp, both of Burg de Zeeuwstraat 52, Numansdorp, Netherlands

[21] Appl. No.: 824,345
[22] Filed: Jan. 23, 1992
[51] Int. Cl.$^5$ .............................................. A22C 21/00
[52] U.S. Cl. .................................. 452/165; 456/160; 456/163; 456/170
[58] Field of Search ............. 452/165, 149, 151, 153, 452/155, 160, 163, 167, 166, 170

[56] References Cited

U.S. PATENT DOCUMENTS

| | | | |
|---|---|---|---|
| 4,558,489 | 12/1985 | Van Mill | 452/149 |
| 4,951,353 | 8/1990 | Tieleman | 452/167 |
| 4,964,194 | 10/1990 | Kessler et al. | 452/167 |
| 5,015,213 | 5/1991 | Hazenbroek | 452/151 |
| 5,019,013 | 5/1991 | Hazenbroek | 452/167 |
| 5,035,673 | 7/1991 | Hazenbroek | 452/151 |
| 5,092,815 | 3/1992 | Polkinghorne | 452/163 |

Primary Examiner—Willis Little
Attorney, Agent, or Firm—Hopkins & Thomas

[57] ABSTRACT

Poultry carcasses (10) are carried in series by an overhead conveyor system along an internal guide rail (33), with protrusions of the vertebrae received in the downwardly facing slot (37). The thighs (12) spread apart by a pair of joint opening guide rods (43 and 44) to open the thigh joints and joint separating wheels (51, 52) engage the knuckles of each thighbone and urge the knuckles upwardly and out of mating engagement with the backbone (10) to thereby separate the thigh joints.

21 Claims, 3 Drawing Sheets

THIGH JOINT SEPARATOR AND CARCASS HALVING APPARATUS

FIELD OF THE INVENTION

This invention relates in general to a method and apparatus for automatically opening and separating the thigh joints of poultry carcasses. More particularly, the invention relates to a method and apparatus for urging each knuckle of the thigh bones of a poultry carcass out of mating engagement with the back bones of the poultry carcass to open and dislocate the connecting joints between the thighs and back of the poultry carcass.

BACKGROUND OF THE INVENTION

In the processing of chickens, turkeys, and other types of poultry through a poultry processing plant for defeathering, evisceration, cut-up, and packaging for delivery and sale, it is highly desirable to form as many of the processing steps as possible with automated machinery. This is necessary to minimize the more expensive manual handling of poultry carcasses as well as to uniformly cut apart the carcasses.

In recent years, poultry carcasses have been suspended by their legs from a suspended "overhead" conveyor system and many of the processing steps have been performed on the poultry carcasses as they are moved in series along the overhead conveyor system. For example, the poultry carcasses can be defeathered, decapitated, opened, and eviscerated while being advanced progressively through a poultry processing plant on an overhead conveyor system. It is further desired that the poultry carcasses be segmented while continuing their travel on the overhead conveyor system, so as to avoid the manual handling of the poultry carcasses when performing the cutting functions. Examples of such on-line cup-up operations are shown by U.S. Pat. Nos. 5,015,213 and 5,035,673. However, it is still a common practice to remove the poultry carcasses from the overhead conveyor system in order to subdivide the poultry carcasses.

A problem with cutting apart the poultry carcasses as they are carried by the overhead conveyor system generally has been that it is difficult to make clean and accurate cuts between the bones of a joint to separate the poultry carcasses into parts. Since the joints usually are still connected by the tissue or only partially separated when the cutting blade begins its movement through the joints, there is a risk that the cutting blade will engage the bones of the joints. Such engagement tends to create fragments of bone that can become lodged in the meat of the poultry parts. Such bone fragments pose health risks to the purchasers and consumers of the poultry parts and cause the poultry parts to be down graded in quality.

Additionally, when poultry products are cooked, it is desirable to cook the products rapidly so that the heat energy is conserved. It is highly desirable to cook the products uniformly so that the thinner portions of the product are not overcooked and thicker or more massive portions of the poultry parts are not undercooked. When the back of a poultry carcass is not separated from the thighs of the poultry carcass prior to being cooked, it is difficult to obtain uniform cooking of the poultry part. This is due to the thickness of the poultry part in the area of the joint between each thigh bone and back, which is greater than, for example, the leg of the product. As a consequence, the cooking process must be performed at a lower temperature and for a long time in order to have the heat properly penetrate the massive portion of the thigh/back at the thigh joints, in order to properly cook this part of the poultry carcass.

In order to increase the rate of cooking undivided sections, it is possible to open and dislocate the joint between them so as to reduce the density of the meat/bone in this area of the poultry carcass and to expose the ends of the bones which enables the heat to more easily reach the bone ends. This dislocation or separation of the joint elements typically requires an additional step in the process of the handling of the poultry carcasses.

Therefore, it can be seen that it would be desirable to provide an improved method and apparatus for opening and dislocating the thigh joints of poultry carcasses as the poultry carcasses are moved in series along an overhead conveyor of a poultry processing system in which the poultry carcasses are otherwise processed by automated equipment so as to avoid further manual handling of the poultry carcass parts to open the joints.

SUMMARY OF THE INVENTION

Briefly described, the present invention comprises a method and apparatus for automatically dislocating and separating the thigh joints of poultry carcasses and splitting the poultry carcasses as the poultry carcasses and are moved in spaced series through a series of processing stations. As the poultry carcasses move along the processing path suspended from the overhead conveyor system the conveyor system turns each carcass so that the back of each carcass faces the direction of movement of the carcass. The back of each poultry carcass engages lower guide rods which tilt the carcass rearwardly with respect to the direction of movement so that the opening at the tail of the previously eviscerated cavity of each carcass is oriented toward the direction of movement of the carcass along the processing path. An internal guide rail extends parallel to the processing path of the poultry carcasses and the opening of the visceral cavity of each bird moves about and rides on the internal guide rail and the internal guide rail supports the poultry carcasses as they are moved along the processing path.

In the disclosed embodiment, the breasts of the carcasses are removed before the carcasses have their thigh joints separated; however, the same process can be performed on birds that still have their breasts.

As the poultry carcasses are pulled forwardly onto and along the internal guide rail by the overhead conveyor a pair of lower guide bars slidably engages the back of the carcass, straddling the vertebrae protrusions of the carcass along the surface of the back of the carcass. The lower guide bars urge the internal vertebrae protrusions of the visceral cavity to extend into a longitudinal slot of the internal guide rail, thereby stabilizing the carcass as it moves along the internal guide rail. In the meantime an upper pair of guide rods slidably engages the carcass at the intersections of the thighs with the back of the bird so as to spread and stabilize the thigh/back bone joints, tending to open the thigh/back bone joints. A pair of wheel members functioning as joint separating means straddle the internal guide rail along the processing path of the poultry carcasses to abruptly engage the thigh joints of the poultry carcasses, to thrust the thigh bones away from the back of the bird. This causes the thigh joints to become dislocated and the tendons and tissue which held the joints together to be stretched and pulled apart, thereby completing the separation of the thigh joints.

In the disclosed embodiment a rotary halving blade is positioned along the length of the internal guide rail, downstream from the joint separating means, and the poultry carcasses are pulled into engagement with the rotary halving blade which cuts through the poultry carcasses to separate the poultry carcasses into halves.

Thus, it is an object of this invention to provide an improved method and apparatus for dislocating and separating the joints between the thighs and backs of poultry carcasses.

Another object of this invention is to provide a method and apparatus for separating the joints between the thighs and backs of poultry carcasses as the poultry carcasses are transported in series, suspended in an inverted attitude by their legs on an overhead conveyor system.

Another object of this invention is to provide an improved method and apparatus for automatically separating the joints of poultry carcasses as the poultry carcasses are carried in series, suspended by their legs and thighs from an overhead conveyor system.

Other objects, features, and advantages will become apparent upon reading the following specification, when taken in conjunction with the accompanying drawings.

DESCRIPTION OF THE PREFERRED EMBODIMENT

Figure 1:
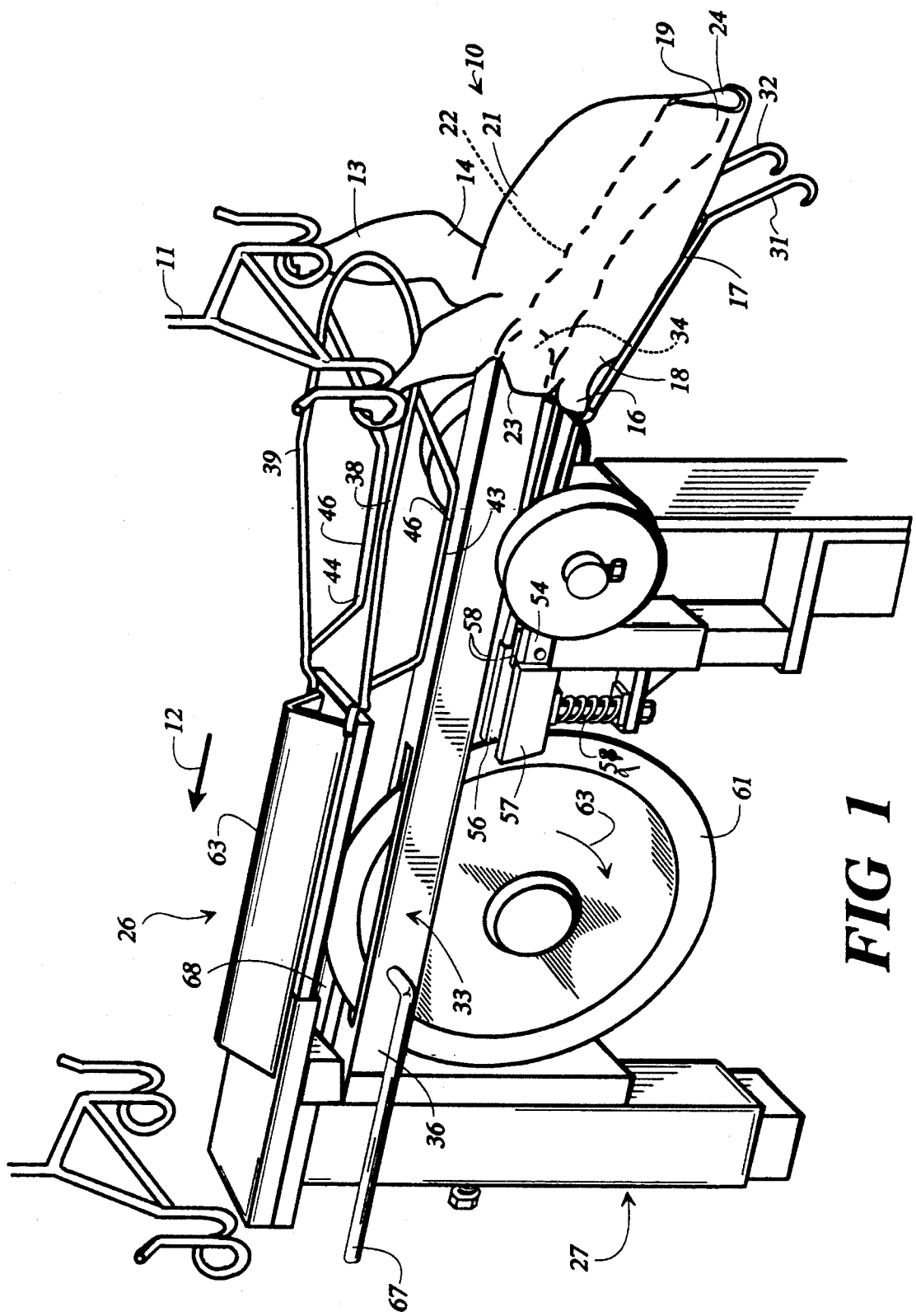
FIG. 1 is a perspective illustration of the thigh joint separator and carcass halving apparatus, showing a bird as it is received on the internal guide rail.

Referring now in greater detail to the drawings, in which like numerals indicate like parts throughout the several views, FIG. 1 illustrates a poultry carcass 10 suspended from a shackle 11 of a conventional overhead conveyor system of the type that moves shackles 11 and the birds supported by the shackles in series along a processing path, as shown by arrow 12. The poultry carcasses each include legs 13, thighs 14, tail 16, upper back 17, lower back 18, the vertebrae 15 (FIG. 2) of the back, and neck 19. A breast portion 21 can be present on the carcass or the breast can be removed by a prior process. A visceral cavity 22, shown in dashed lines, extends through the poultry carcass, from a visceral opening 23 at the tail of the poultry carcass to a neck opening 24 left by the prior removal of the crop and windpipe (not shown).

As illustrated in FIG. 1, the poultry carcasses 10 are carried by the shackles 11 of the overhead conveyor system in the direction of arrows 12 with each poultry carcass hanging invertedly by its legs 13 with its tail 16 facing upwardly, the neck 19 facing downwardly and back facing in the direction of movement. The wings (not shown) and breast of the poultry carcass 10 typically have been removed from the poultry carcass prior to entering the thigh joint separator and carcass halving apparatus 26.

Figure 2:
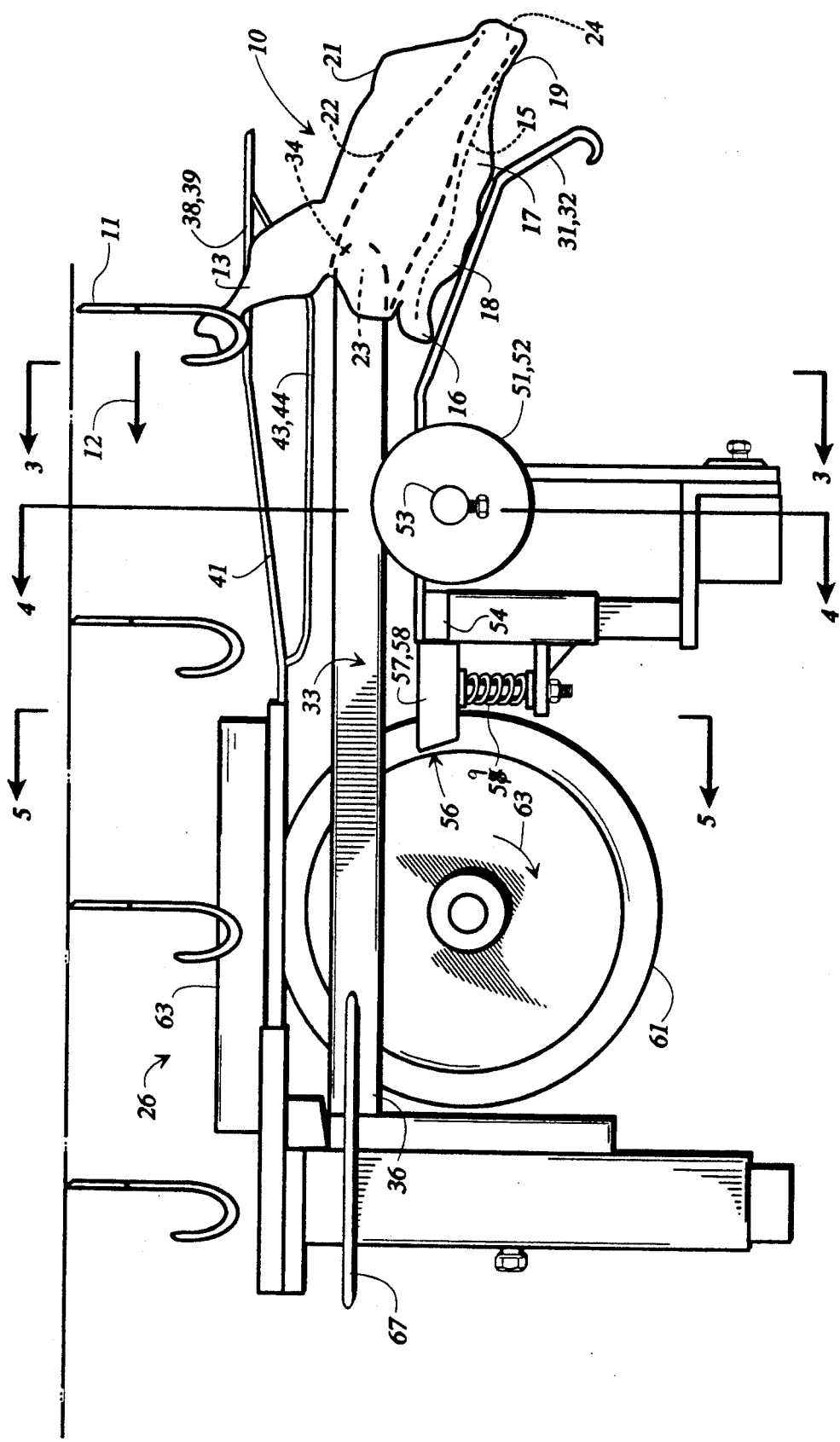
FIG. 2 is a side elevational view of the thigh joint separator and carcass halving apparatus of FIG. 1.

As illustrated in FIGS. 1 and 2, the thigh joint separator and carcass halving apparatus 26 includes an adjustable frame 27, and is mounted in the path of movement 12 of the poultry carcasses 10 on the overhead conveyor system. The thigh joint separator and carcass halving apparatus 26 is mounted to a larger cut-up system apparatus, not shown, such that the thigh joint separator and carcass halving apparatus functions in series with other poultry processing devices as part of a poultry processing line. At the foremost end of the thigh joint separator and carcass halving apparatus 26, are a pair of parallel lower guide rods 31 and 32. The lower guide rods initially are sloped upwardly and as the lower guide rods extend into the apparatus, they gradually become oriented horizontally, becoming aligned with the path of movement 12 of the poultry carcasses 10 along the overhead conveyor system. The guide rods become closely spaced apart along the path and the external protrusions of the vertebrae which extend exteriorly of the carcass are received between and are guided by the lower guide rods.

As FIG. 2 illustrates, the lower guide rods 31 and 32 are the first elements to engage the suspended birds and tilt the birds from a generally vertical attitude toward a rearwardly inclined attitude to align the visceral opening 23 of each poultry carcass with an elongated internal guide rail 33. As shown in FIG. 1 and 2, the internal guide rail 33 extends horizontally along the processing path 12 of the poultry carcasses 10 and includes a tapered nose portion 34, onto which the visceral opening 23 is received, a discharge end 36 and a downwardly facing slot 37 (FIGS. 3 and 4) formed along its length between the nose portion 34 and the discharge end 36. The internal guide rail 33 receives and supports the visceral cavities of the poultry carcasses as the poultry carcasses proceed along their processing path, with the internal protrusions of the vertebrae extending into the visceral cavity of each bird riding in the slot 37.

Figure 3:
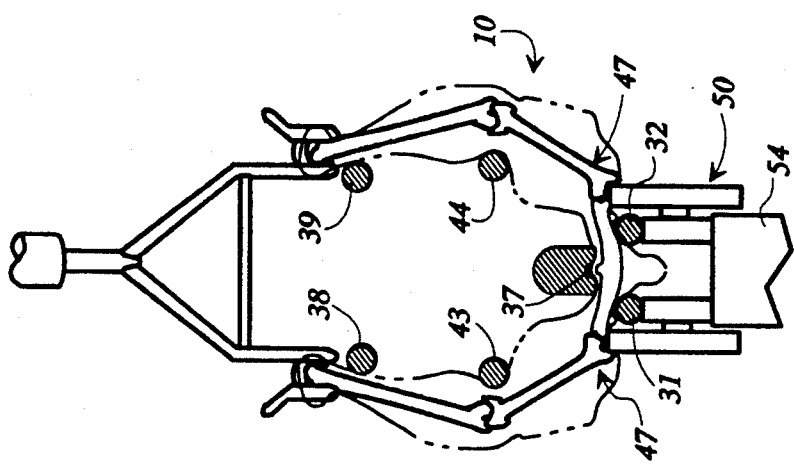
FIG. 3 is an end cross-sectional view, taken along lines 3—3 of FIG. 2, showing a bird mounted on the inner guide rail as the bird approaches the joint displacement wheels.

As illustrated in FIGS. 1 and 3, upper guide rods 38 and 39 are mounted above and on opposite sides of the internal guide rail 33, extending along the path of movement of the poultry carcasses 10 (FIG. 1). The upper guide rods 38 and 39 initially extend horizontally, parallel to the path of movement of the poultry carcasses, and then slope downwardly, as shown at 41 in FIG. 2, toward the internal guide rail.

Figure 4:
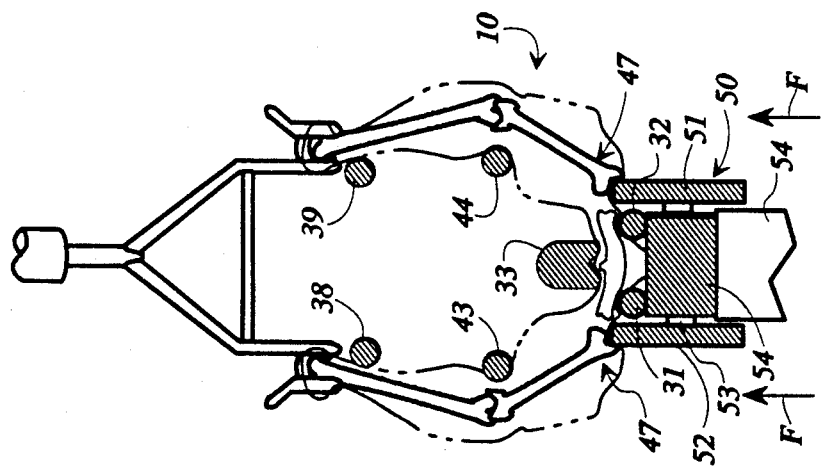
FIG. 4 is an end cross-sectional view, taken along lines 4—4 of FIG. 2, showing a bird as it has its thighs displaced from its backbone by the joint displacement wheels.

As FIGS. 1-4 illustrate, a pair of joint opening guide rods 43 and 44 are mounted to the upper guide rods 38 and 39, projecting outwardly and downwardly from the upper guide rods 38 and 39. As illustrated in FIGS. 1 and 2, each joint opening guide rod includes a horizontal run 46 extending in the direction of movement of the poultry carcasses 10. As shown in FIGS. 1, 3 and 4, the joint opening guide rods 43 and 44 are mounted in a position to engage the carcasses adjacent their connecting joints 47 between the legs and thighs of the poultry carcasses as the poultry carcasses proceed along their processing path so as to stabilize the joints and to spread the thighs of the carcass apart, tending to open the joints.

A joint separating means 50 is mounted below the joint opening guide rods 43 and 44, in a position to engage the connecting thigh joints 47 between the thighs 14 and lower backs 18 of the poultry carcasses 10. The joint separating means 50 includes a pair of rotatable wheels 51 and 52 mounted upon an axle 53 that extends through a support block 54 of the thigh joint separator and carcass halving apparatus. The wheels are mounted on opposite sides of the internal guide rail 33 and straddle lower guide rods 31 and 32, in a position to engage the thighs of the poultry carcasses as the poultry carcasses are pulled along the length of the internal guide rail 33.

Figure 5:
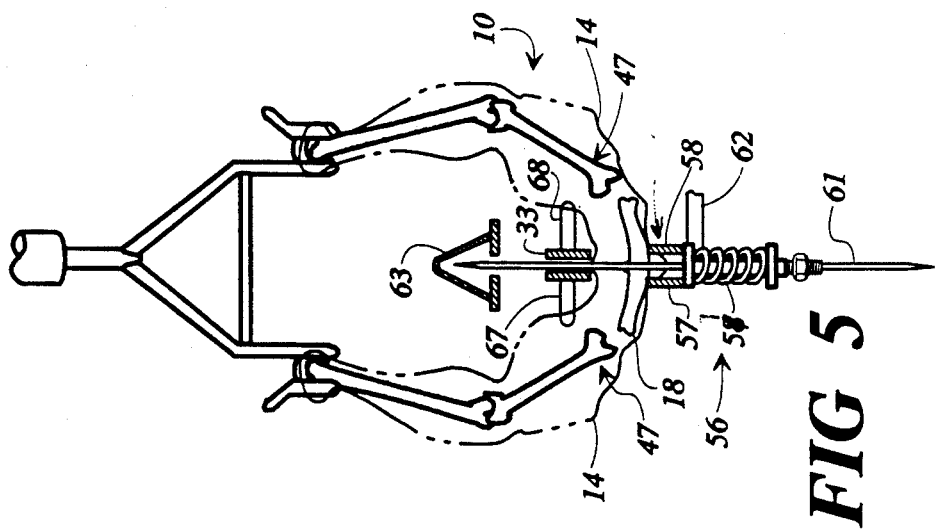
FIG. 5 is an end cross-sectional view, taken along lines 5—5 of FIG. 2, showing the bird as it is being cut in half.

As shown in FIGS. 1, 2 and 5, a spring biased positioning member 56 is mounted to the downstream side of support member 54. The positioning member 56 includes a pair of metal plates 57 and 58 pivotally attached to support member 54. A compression spring 59 is mounted beneath plates 57 and urges the plates upwardly toward the internal guide rail 33. Consequently, as a poultry carcass 10 is pulled along the internal guide rail and is engaged by the plates 57 and 58 of the positioning member 56, the internal surfaces of the upper and lower back portions of the poultry carcasses are pressed against the internal guide rail and are thus firmly positioned for cutting.

A large rotary halving blade 61 is mounted adjacent the positioning member 56, extending partially between the plates 57 and 58 of the positioning member. The halving blade 61 is mounted upon an axle 62 and extends upwardly through the slot 37 formed in the internal guide rail 33. The halving blade 61 is rotated in the direction of arrows 63 by a drive motor (not shown) and engages the poultry carcasses as the poultry carcasses are pulled along the internal guide rail to separate the poultry carcasses along the backbone of each carcass.

As shown in FIGS. 1, 2 and 5, an inverted V-shaped hood 63 is mounted to the ends of the upper guide rods 38 and 39 and functions as a cover for the rotary halving blade 61, to prevent exposure of the blade and spray of debris created by the cutting of the poultry carcass.

As illustrated in FIGS. 1 and 2, a pair of exit guide bars 67 and 68 are attached to the internal guide rail 33 adjacent the discharge end 36 of the internal guide rail. The guide bars extend outwardly from the internal guide rail at an angle, and then extend horizontally, as indicated, extending approximately parallel to the processing path 12.

OPERATION

As illustrated in FIG. 1, each poultry carcass 10 is carried by the shackles 11 along a path of movement 12 toward the thigh joint separator and halving apparatus 26. As the poultry carcasses enter the apparatus, the upper and lower back portions 17 and 18 of the poultry carcasses engage the lower guide rods 31 and 32, which cause the poultry carcasses to tilt rearwardly to align the visceral opening 23 of each poultry carcass 10 with the nose portion 34 of the internal guide rail 33. As the poultry carcasses 10 are pulled forwardly along their processing path by their shackles 11, the poultry carcasses are pulled onto the internal guide rail with the internal guide rail extending through the visceral cavity 22 of each poultry carcass.

As each poultry carcass 10 is pulled onto and along the internal guide rail 33, the upper and lower back portions 17 and 18 thereof are straddled by and supported by and ride along the lower guide rods 31 and 32. At the same time, the upper guide rods 38 and 29 project between the legs 13 of the birds and the joint opening guide rods 43, 44 press the thighs 14 outwardly. The guide rail receives the internally projecting portion of the vertebrae in the longitudinal slot 37 and the lower guide rods 31, 32 straddle the outer projecting portion of the vertebrae and press the back of the bird upwardly against the internal guide rail 33. As a result of the leg joints 47 being urged outwardly, the thigh joints 47 between the thighs 14 and the lower back 18 of each poultry carcass tend to open and the tendons and other tissue (not shown) holding the connecting thigh joints 51 between the thigh bones and and the backbones are stretched and become taut.

As the poultry carcasses 10 are pulled forwardly with their legs spread outwardly, their thigh joints 47 are abruptly engaged by the wheel members 51 and 52 of the joint separating means 50. As FIG. 4 illustrates, the wheel members 51 and 52 engage the knuckle of each thigh bone at the thigh joints. As the knuckle of each thigh bone passes over the wheel members, the knuckles are urged upwardly in the direction of arrows F. With the internal guide rail 33 and the lower guide rods 31 and 32 holding the backs of the poultry carcasses fixed in place as it slides along the guide rail and the shackles and joint opening guide rods restricting further vertical and lateral movements of the legs and thighs, the wheel members 51 and 52 force the dislocation of the thigh bone from the back of the carcass upon the application of the sudden upward forces against the thigh joints, as shown by arrows F of FIG. 4. Thus, each thigh bone is dislocated from its mated engagement with the backbone of the poultry carcass 10.

Additionally, the dislocating of the knuckles of the thigh bones by the wheel members 51 and 52 causes some of the tendons and other tissue holding the thigh joints 51 together, which have been stretched tight by the joint opening guide rods 43 and 44, to separate or tear apart. Thus, the thigh joints 47 (FIG. 5) of the poultry carcasses 10 are completely separated so that the thighs 14 of the poultry carcass 10 can be easily and cleanly separated from the lower back 18 of the poultry carcass by later cutting operations without as much risk of hazardous bone fragments being created and becoming lodged in the meat of the poultry carcasses.

Once the connecting thigh joints 51 between the thighs 14 and lower backs 18 of the poultry carcasses 10 have been separated, the poultry carcasses are moved further along the internal guide rail 33 (FIG. 5) toward the rotary halving blade 61. As the poultry carcasses are pulled into engagement with the spring biased positioning member 56, the positioning member urges the poultry carcasses upwardly, pressing the upper and lower back portions 17 and 18 flat against the lower side of the internal guide rail 33 to align and center the poultry carcasses and hold the poultry carcasses fixed in the proper position for cutting, to ensure that the poultry carcasses are cleanly and accurately separated by the rotary halving blade 61.

The poultry carcasses 10 are pulled into engagement with the rotary halving blade 61, which cuts through the poultry carcasses to thereby split the poultry carcasses in half.

Once the poultry carcasses have been separated by the rotary halving blade 61, they are carried by their shackles 11 into engagement with the guide bars 67 and 68 at the discharge end 36 of the internal guide rail 33. The guide bars urge the carcass halves apart, to ensure they are fully separated as the carcass halves proceed along the overhead conveyor system for further processing by subsequent processing stations.

It will be understood that the foregoing relates only to a preferred embodiment of the present invention, and that numerous changes and modifications can be made therein without departing from the spirit and scope of the invention as set forth in the following claims.

We claim:

1. A method of opening and dislocating the thigh joints of previously eviscerated poultry carcasses comprising the steps of:
    moving poultry carcasses with an overhead conveyor system along a processing path suspended by their legs in an inverted attitude and as each poultry carcass moves along the processing path,
    orienting the vertebrae of the carcass approximately parallel to the processing path,
    supporting the vertebrae of each poultry carcass adjacent the thigh joints of the poultry carcass, and
    urging the knuckles of the thigh bones out of mating engagement with the backbones of each poultry carcass.

2. The method of claim 1 and further including the steps of applying tension to the tendons and tissue holding the thigh joints between the thighs and lower backs of the poultry carcasses together, and as the knuckle of each thigh bone is urged out of mating engagement with the backbones of the poultry carcasses, pulling the tendons and tissue apart to complete the separation of the thigh joints.

3. The method of claim 1 and wherein the step of supporting the vertebrae of each poultry carcass comprises moving the protrusions of the vertebrae of the carcass facing the visceral cavity along a guide slot of guide means extending along the processing path.

4. The method of claim 1 and wherein the step of supporting the vertebrae of each poultry carcass comprises moving the protrusions of the vertebrae of the carcass facing the exterior of the carcass along a guide slot off guide means extending along the processing path.

5. The method of claim 1 and wherein the step of moving poultry carcasses in spaced series along a processing path comprises moving the carcasses with their backs facing the direction of movement along the processing path, and wherein the step of orienting the vertebrae of the carcass approximately parallel to the processing path comprises tilting the carcass until its vertebrae become approximately parallel to the processing path, and wherein the step of supporting the vertebrae of the carcass comprises moving the carcass along an internal guide rail with the thighs of the carcass straddling the guide rail, and wherein the step of urging the knuckles of the thigh bones out of mating engagement with the backbone comprises moving the carcass over a pair of wheel members that straddle the path of the backbone as the backbone is moving along the internal guide rail.

6. The method of claim 1 and further including the steps of after the thigh joints have been dislocated and as the backbone is being supported, passing the poultry carcasses into engagement with a cutting means, and cutting through the poultry carcasses to subdivide the poultry carcasses.

7. The method of claim 1 and wherein the step of engaging the thigh joints with a joint separating means comprises moving the poultry carcasses adjacent a pair of rotatable wheel members and applying a force to the knuckle of each thigh bone at the thigh joints with the wheel members to urge the knuckles out of engagement with the backbone of each carcass.

8. A method of dislocating the thigh/backbone joints of previously eviscerated poultry carcasses comprising:
    moving the carcasses in series along an internal guide rail with the protrusions of the vertebrae extending toward the visceral cavity riding in a slot extending along the guide rail, and
    as the carcasses move along the internal guide rail abruptly urging the thigh bones out of the thighbone/backbone sockets.

9. The method of claim 8 and wherein the step of abruptly urging the thigh bones out of the thighbone/backbone sockets comprises the step of moving the carcasses into engagement with a pair of wheel members that straddle the path of movement of the vertebrae.

10. The method of claim 8 and wherein the step of moving the carcasses in series along an internal guide rail comprises moving the carcasses suspended by their legs with a conveyor.

11. The method of claim 10 and further including the step of tilting the carcasses toward a position with the vertebrae of the carcasses extending approximately parallel to the internal guide rail.

12. Apparatus for dislocating and separating the thigh joints of birds as the birds are carried in series along a processing path on an overhead conveyor system suspended by their legs and thighs in an inverted attitude, comprising:
    an elongated internal guide rail aligned with the processing path of the birds carried on the overhead conveyor system for receiving and supporting the visceral cavities of the birds;
    a pair of joint opening guide rods positioned adjacent said internal guide rail to engage and urge the thighs of the birds outwardly as the birds are moved along said internal guide rail;
    a joint separating means mounted adjacent said internal guide rail below said joint opening guide rods for engaging and dislocating the thigh joints between the thighs and lower backs of the birds; and
    whereby as the birds are moved along said internal guide rail, the thighs of the birds engage said joint opening guide rods and are urged outwardly, stretching the tendons and tissue holding the thigh joints together, and as the birds engage the joint separating means, the knuckle portion of the thigh bones at each thigh joint of the birds is urged out of mating engagement with the backbone of each bird to dislocate the thigh joints and the tendons and tissue holding the thigh joints together are pulled apart to thereby completely separate the thigh joints of the birds.

13. The apparatus of claim 12 and further including a rotary halving blade mounted along the length of said internal guide rail in the processing path of the birds for subdividing the birds as the birds are moved along the length of said internal guide rail.

14. The apparatus of claim 12 and further including a pair of parallel lower guide rods mounted adjacent said internal guide rail and initially sloping upwardly toward said internal guide rail for engaging and tilting the birds toward said internal guide rail to align the visceral openings of the birds with said internal guide rail and for supporting the backs of the birds as the thigh joints of the birds are engaged by said joint separating means.

15. The apparatus of claim 12 and wherein said joint separating means comprises a pair of rotatable wheel members mounted on opposite sides of said internal guide rail in the processing path of the birds in a position to engage the knuckles of the thigh bones of the birds.

16. Apparatus for opening the thigh joints of poultry carcasses as the carcasses are moved along a processing path suspended in an inverted attitude from an overhead conveyor line by their legs comprising:

an elongated internal guide rail aligned with the processing path of the carcasses and extending approximately parallel to the overhead conveyor line for receiving and supporting the carcasses as the carcasses proceed along the processing path;

means for urging the legs and thighs of the carcasses outwardly to stretch the tendons and other tissue holding the thigh joints of the carcasses together, mounted adjacent said internal guide rail in a position to engage the thighs of the carcasses as the carcasses proceed along their processing path;

joint separating means mounted adjacent said internal guide rail for engaging the thigh joints of the carcasses to urge each knuckle of the thigh bones of the carcasses away from engagement with the backbones of the carcasses so as to open and dislocate the connecting joint between the thighs and lower backs of each carcass.

17. The apparatus of claim 16 and further including cutting means mounted along said internal guide rail in the processing path of the carcasses for splitting the carcasses.

18. The apparatus of claim 16 and wherein said joint separating means comprises a pair of wheel members straddling said internal guide rail and mounted in a position to engage the knuckle of a thigh bone of each carcass as the carcasses are urged along the length of said internal guide rail, and wherein said wheel members urge the knuckles of each of the thigh bones of each carcass, causing the stretched tendons and tissue holding the thigh joints together to be pulled apart to open and separate the connecting joint between the thigh bones and backbone of each carcass.

19. The apparatus of claim 17 and wherein said cutting means comprises a rotary halving blade mounted along the length of said internal guide rail, extending through said internal guide rail to engage and separate the carcasses as the carcasses are urged along said internal guide rail.

20. The apparatus of claim 16 and wherein said means from urging the legs and thighs of the carcasses outwardly includes a pair of joint opening guide rods mounted above and adjacent said internal guide rail and angles away from said internal guide rail for engaging and urging the legs and thighs of the carcasses outwardly so as to stretch the tendons and tissue holding the thigh joints together.

21. The apparatus of claim 16 and wherein said guide rail includes an elongated slot for receiving the protrusions of the vertebrae extending into the visceral cavity of the carcasses.

* * * * *